Dec. 14, 1954  C. E. MILLER  2,696,897
CLUTCH
Original Filed Aug. 20, 1947   4 Sheets-Sheet 1
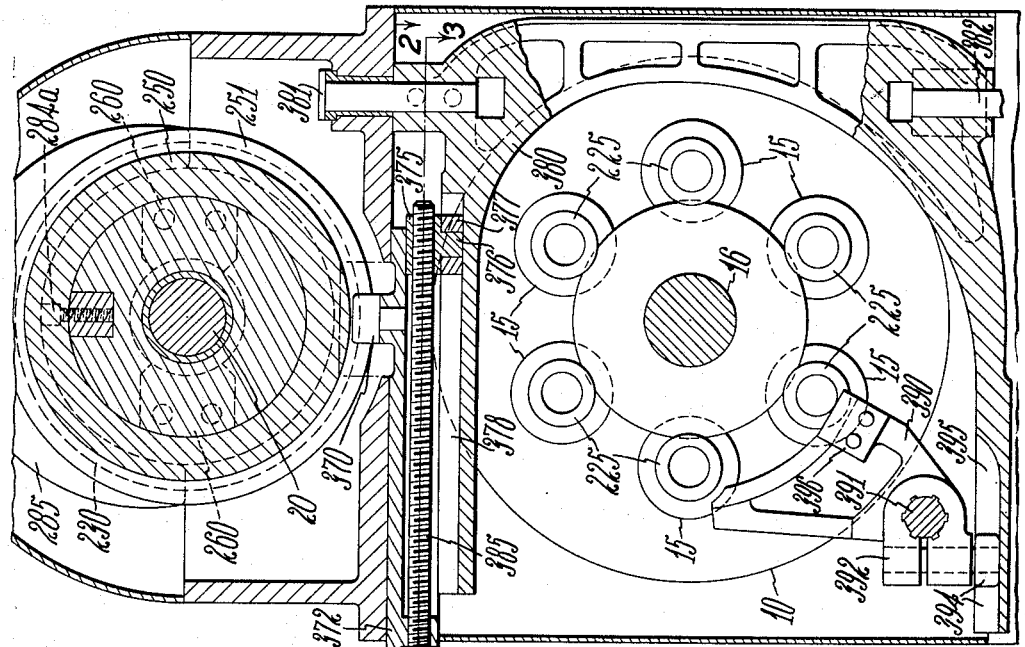
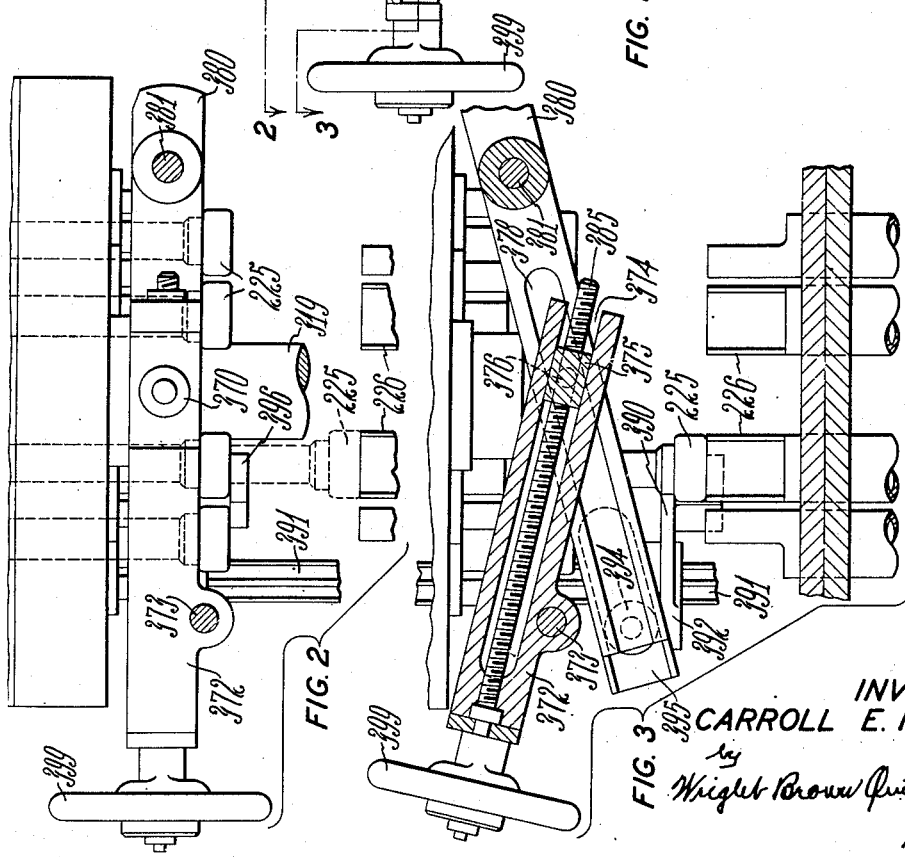
INVENTOR
CARROLL E. MILLER
by
Wright Brown Quinby & May
ATTYS Dec. 14, 1954
C. E. MILLER
2,696,897
CLUTCH
Original Filed Aug. 20, 1947
4 Sheets-Sheet 2
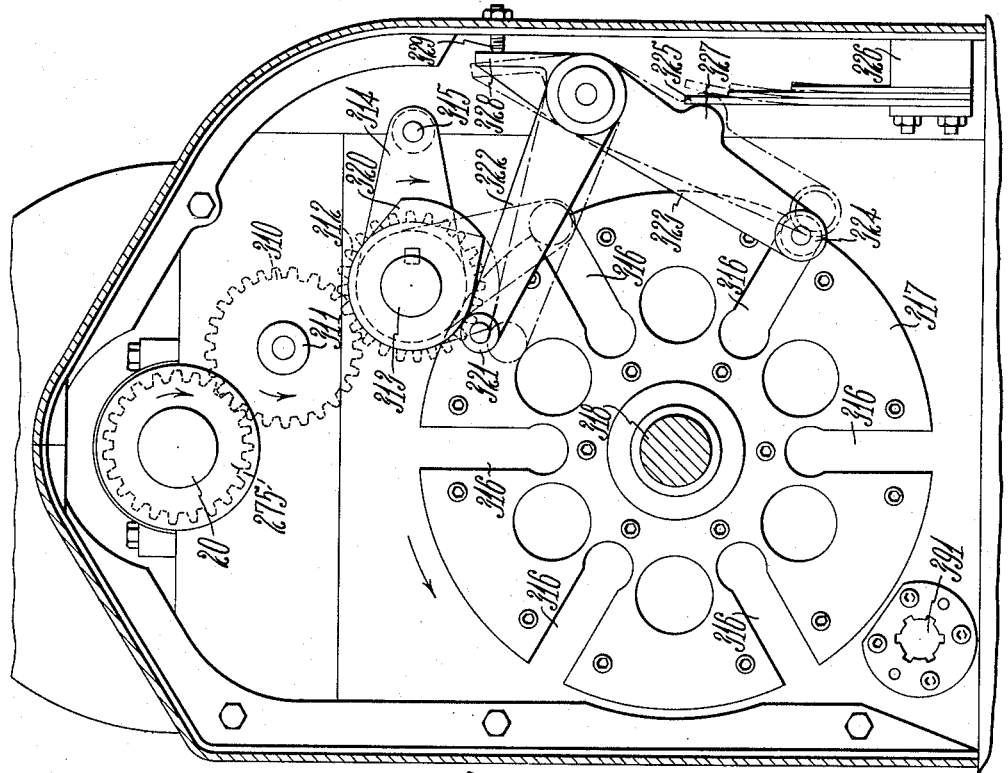
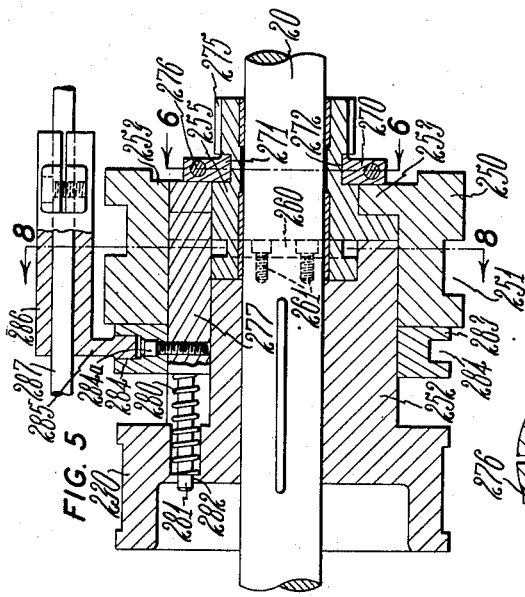
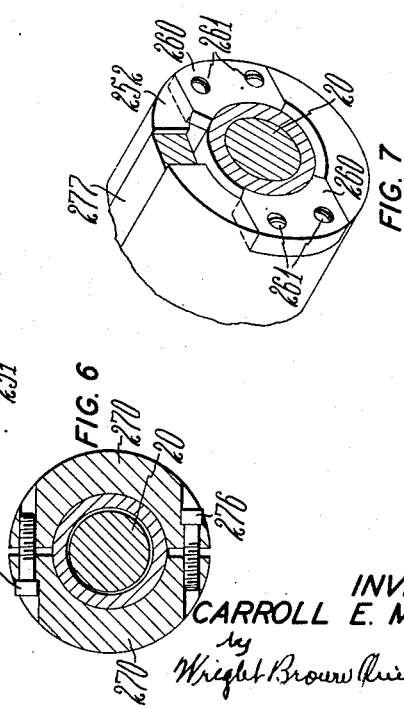
INVENTOR
CARROLL E. MILLER
ATTYS Dec. 14, 1954  C. E. MILLER  2,696,897
CLUTCH
Original Filed Aug. 20, 1947  4 Sheets-Sheet 3
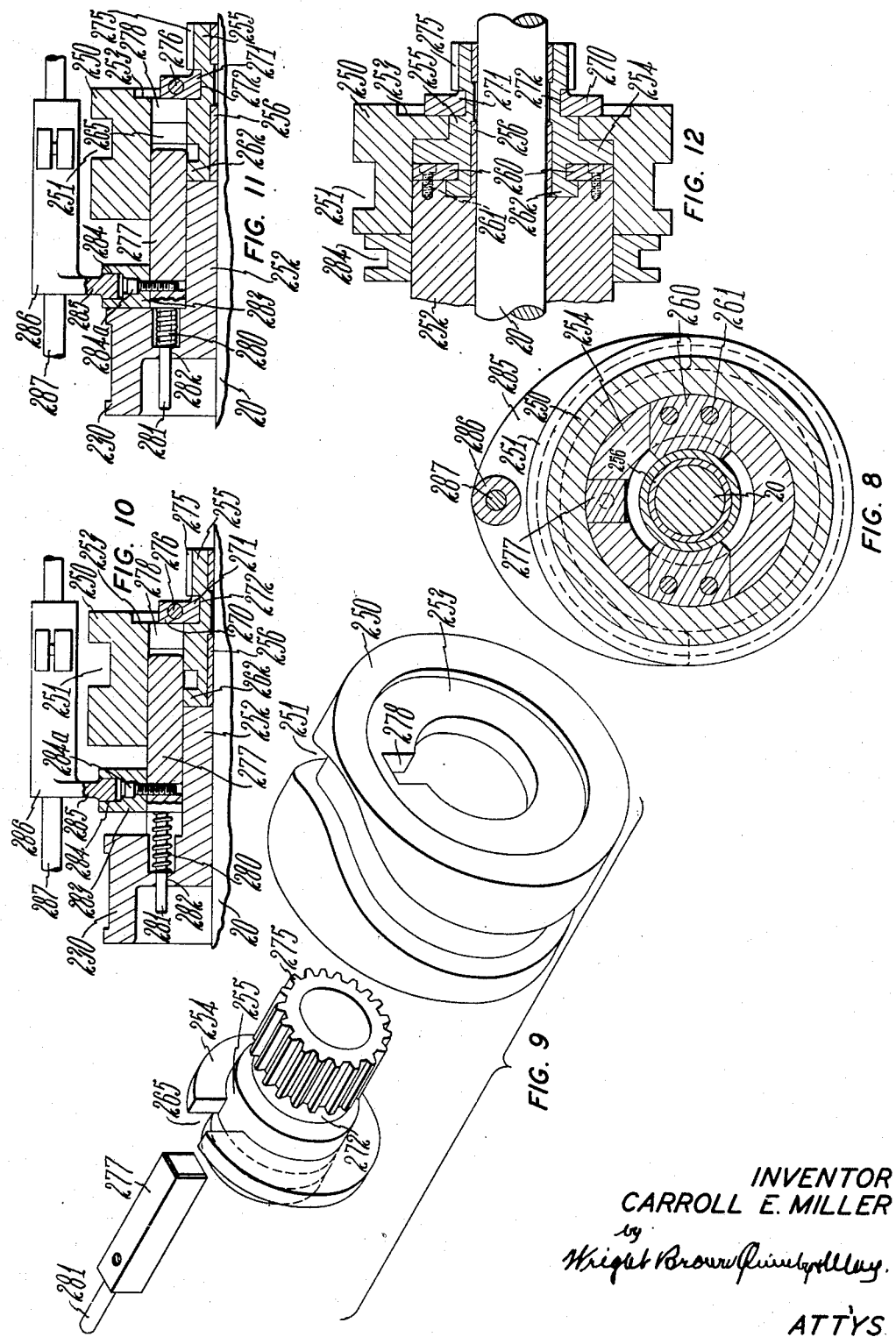
INVENTOR
CARROLL E. MILLER
ATTYS Dec. 14, 1954
C. E. MILLER
2,696,897
CLUTCH
Original Filed Aug. 20, 1947
4 Sheets-Sheet 4
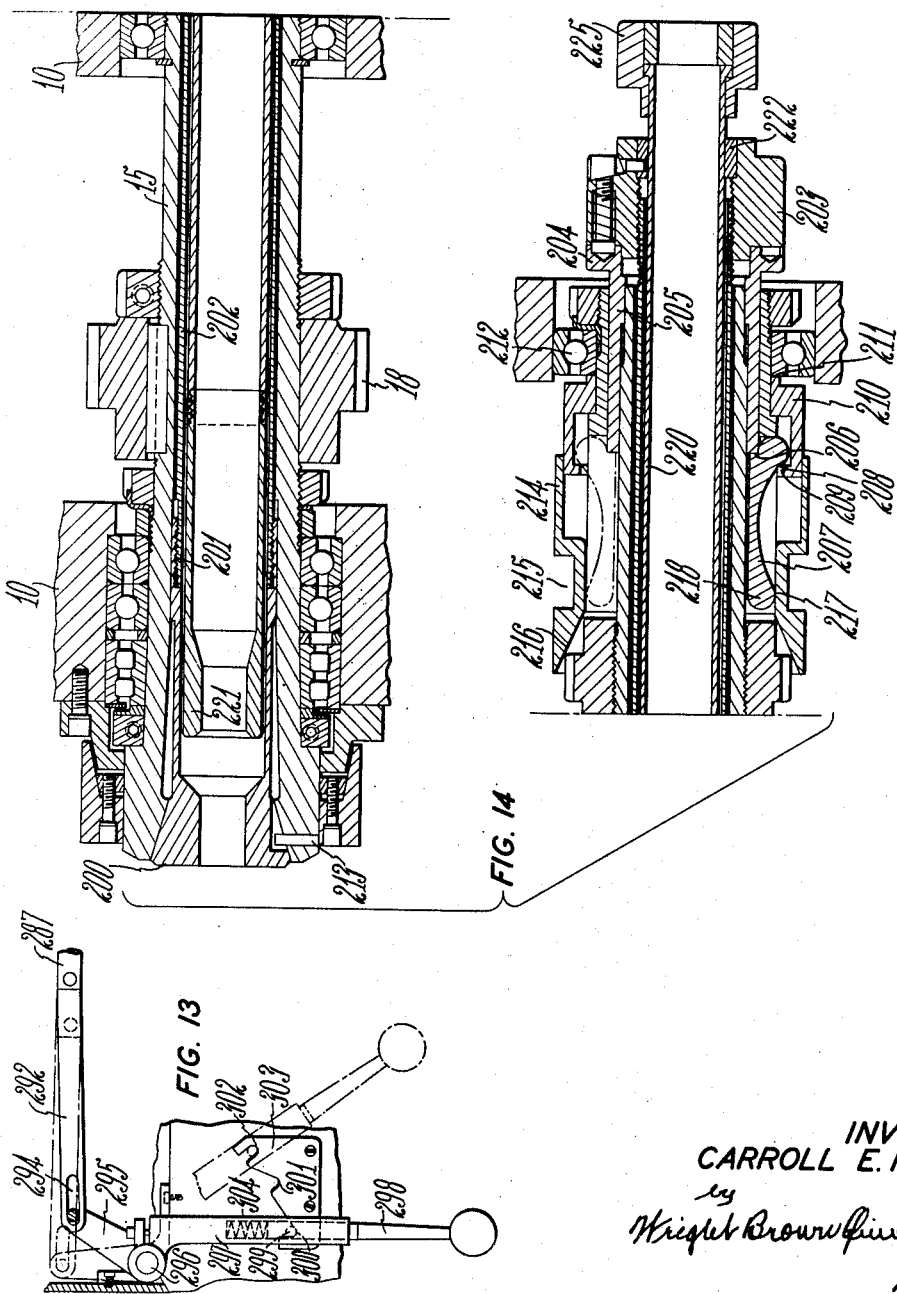
INVENTOR
CARROLL E. MILLER
ATTYS

United States Patent Office 2,696,897
Patented Dec. 14, 1954

2,696,897

CLUTCH

Carroll E. Miller, Windsor, Vt., assignor to Cone Automatic Machine Company Inc., Windsor, Vt., a corporation of Vermont Original application August 20, 1947, Serial No. 769,636. Divided and this application June 28, 1950, Serial No. 170,934

1 Claim. (Cl. 192—67)

This invention relates to stock control and feed mechanism for lathes, and more particularly for multiple spindle lathes, and has for one object to provide such a mechanism which is adjustable for length of feed from outside of the machine.

A further object is to improve the action of the chuck opening and closing mechanism, and to make the entire stock feeding and clamping mechanism self-locking so that it will not unlock by centrifugal force or other fortuitous condition.

Another object is to provide means for operatively disconnecting the stock feed and the indexing mechanism in predetermined order to facilitate setting up of the machine.

Further objects and advantages will appear from a description of structures shown in the accompanying drawings in which Figure 1 is a fragmentary vertical section through the upper portion of a multiple spindle automatic lathe embodying the invention.

Figures 2 and 3 are detail sectional views on lines 2—2 and 3—3, respectively, of Figure 1.

Figure 4 is a sectional view somewhat similar to Figure 1, but showing the indexing mechanism.

Figure 5 is a fragmentary sectional view through certain parts carried by the main cam shaft shown in Figure 1 and 4.

Figures 6 and 8 are detail sectional views on lines 6—6 and 8—8, respectively, of Figure 5.

Figure 7 is a fragmentary perspective view with parts broken away and in section of parts shown in section in Figure 8.

Figure 9 is an exploded perspective view of parts shown in Figure 5.

Figures 10 and 11 are detail sectional views similar to portions of Figure 5, but with the parts in different relative positions.

Figure 12 is a detail sectional view at right angles to Figure 5.

Figure 13 is a fragmentary view partly in front elevation and partly broken away of a control mechanism.

Figure 14 is a longitudinal sectional view through one of the work spindles.

This application is a division of my application Serial No. 769,636 filed August 20, 1947, and now abandoned, for Multiple Spindle Lathe and reference may be had to this application for details of this machine not herein illustrated.

As shown in Figure 1, a plurality of work spindles 15 are positioned in an indexing spindle carrier 10, being arranged in circular array about the axis of the work carrier and on which the carrier is journaled. Each spindle is rotated and for this purpose it is provided with a gear 18 (see Figure 14) which meshes with a suitable drive gear (not shown) on a shaft 16 concentric with the spindle carrier and which is suitably power driven as by means well known in the art.

Work spindles and carrier

Details of the work spindles 15 are shown best in Figure 14. As before noted, these spindles are journaled in circular array in the spindle carrier 10 and are provided with gears 18 which mesh with the central gear carried by the shaft 16 for rotating these spindles. Within each spindle is mounted a spring collet 200 having a tapered outer face mating a correspondingly reversely tapered face of the spindle as is well understood in the art. Each collet is held from turning relative to the spindle by a pin and groove connection 213 and is connected at its rear end, as at the threaded connection 201, with a sleeve 202 which extends entirely through the spindle and has threaded on its outer end an enlarged diameter head portion 203.

In the position shown in Figure 14, the head 203 is in its rearmost position in which the collet 200 is closed against the work. Bearing on the forward face of this head 203 is the flanged extremity 204 of an actuating sleeve 205, which is slidable axially on the spindle 15 and is splined thereto. Its forward end butts against a shoulder 206 on the end portion of a plurality of rocker fingers 207 and close to the spindle. This provides a fulcrum for each finger further out from the spindle axis than the engagement with the sleeve 205. One end of each of the fingers 207 has a shoulder 208 adapted to engage behind an inwardly directed flange 209 on a sleeve 210, the outer edge of which butts against the inner bearing raceway 211 of a ball bearing 212 which forms a journal for the adjacent end portion of the spindle 15. Slidable over the sleeve 210, and partly enclosing the sleeve 210, is a second or locking sleeve 214 having at 215 an annular external groove therein outwardly of which it carries an inwardly tapered cam surface 216. In the position shown in Figure 14, this cam surface 216 is beyond the inner end of the fingers 207 which are engaged by a cylindrical internal portion 217 inwardly of the cam surface 216 and opposite to the annular groove 215. This holds the end 218 of each of the fingers pressed toward the outer wall of the spindle 15 in the position shown in Figure 14 and in this angular position of the fingers, the sleeve 205 is wedged rearwardly, closing and holding the collet closed.

By sliding the sleeve 214 to the right or backwardly from the collet 200, the inner ends 218 of the fingers 207 are permitted to ride outwardly along the tapered face 216. This permits the sleeve 205 to slide forwardly, permitting the head 203 and its collet tube to move in the same direction, thus freeing the collet and allowing its stock-gripping extremities to expand and free the work. The closing or opening of the collet is thus effected by producing an axial motion of the sleeve 214 and this is done in suitable timed relation to the cycle of the machine by elements engaging in the peripheral groove 215.

Within the collet tube 202 there is positioned a stock feeder sleeve 220, the forward end of which carries a stock feed gripper 221 of any suitable description, and shown in Figure 14. This sleeve 220 is slidably guided through a bushing 222 in the rear end of the member 203 and has secured at its outer end a head 225 of enlarged diameter, but of smaller diameter than the gripper head 203, by which it may be moved axially of the spindle to feed the work when it is fed forwardly and the collet is open and to draw back on the work for a fresh hold when the collet is closed. In fully retracted position the heads 225 engage the front ends of the stock reel tubes 226 (Figure 3) which are pre-set to correspond with the back travel of the stock pusher sleeve 220 for any required length of stock to be fed.

This spindle mechanism is capable of holding the work securely even though the spindles are being rotated at a high rate of speed, centrifugal force being ineffective to open the collet.

Parallel with the shaft 16 and journaled about it is an overhead rotary cam shaft 20 which carries various cams for controlling motions of various operating mechanisms as is well known in the art. This cam shaft 20 actuates the indexing means for the spindle carrier as shown in Figure 4.

Stock feed

The stock feed is actuated by a cam 250 having a cam groove 251 in its periphery, and this cam 250 is journaled on a hub portion 252 of the collet actuating cam drum 230 (see Figures 1 and 5 to 11, inclusive) carried by the cam shaft 20. It is held axially stationary with reference to this hub portion by an internal flange portion 253 which overlaps an outwardly extending flange 254 on a hub member 255 journaled on a sleeve 256 on the cam shaft 20. The hub member 255 is held against the end of the hub 252 with freedom for rotation relative thereto by a pair of key segments 260 secured in recesses in the end of the hub 252 as by screws 261, and the inner portions of these segments engage the outer face of an outwardly directed flange 262 at the inner end of the hub 255. The segmental keys 260 thus hold the hub 255 against the hub 252. These segmental keys 260 are assembled by radial movement into their sockets and the screws 261 which hold them in place are inserted through a slot 265 in the flange 254, the hub 255 carrying this flange being turned to bring the slot 265 selectively into position for the insertion of each of the screws 261. Next, the cam 250 is moved axially into position with its flange 253 engaging the outer face of the flange 254, and a two part retaining collar 270 (see particularly Figure 6) having a widened central portion 271 is then engaged in an annular recess 272 in the member 255 just inwardly of a pinion portion 275 of this sleeve 255 and its parts are secured together by screws 276. This pinion portion 275 forms a portion of a driving mechanism of the spindle carrier indexing mechanism.

Beside providing means for facilitating the insertion of the screws 261, the slot 265 of the flange 254 may receive a longitudinal key 277 which is slidably carried in a hub 252 of the cam drum 230. This key 277 may take any one of three positions. In its outermost position where it extends through a key slot 278 in the cam member 250, as well as through the slot 265, it couples the hub member 255, which is a portion of the indexing mechanism and also the cam 250 which actuates the stock feed, to rotate with the hub 252 which, in turn, is keyed to the cam shaft 20. It is normally held in this position by means of a spring 280 surrounding a pin 281 secured to the rear end of the key 277 and slidable through a reduced diameter portion 282 of the cam 230. A spool 283 having a peripheral groove 284 is secured to the key 277, as by the screw 284a, and it is slidable between adjacent faces of the cam drum 230 and the cam 250. In the groove of this spool there is engaged a yoke 285 having a hub portion 286 clamped to an actuating rod 287.

The second position of the key 277 is shown in Figure 10 in which it is retracted out of the slot 278 while it still engages in the slot 265. The stock feed cam drum is now operatively disconnected from the cam shaft.

The third position is shown in Figure 11 in which the key 277 is retracted both from the slot 278 and from the slot 265, so that now the indexing actuating mechanism is also disconnected from the cam shaft.

It will thus be seen that one or both of these actuating mechanisms, the stock feed cam drum, or this drum and the indexing drive mechanism, may be disconnected at will from the cam shaft. This is for the purpose of facilitating the setting up of the machine preparatory to a run, but of course during normal operation of the machine, the key 277 is in the position shown in Figure 5 so that both the indexing and the stock feed are operating during the proper portions of the machine cycle.

The rod 287 by which the key 277 is controlled is actuated by the operator. The rod 287 is slidably guided through frame members and at its rear end it is pivoted to a link 292 connected, as shown in Figure 13, through a pin and slot connection at 294 to an arm 295 fixed to a rock shaft 296. On the forward face of the machine, this rock shaft 296 has clamped thereto a lever 297. This lever 297 carries an axially movable handle 298 provided with a pin 299 which may be engaged selectively in any of the three notches 300, 301 and 302 in a plate 303 secured to the machine frame. This handle 298 is urged outwardly as by a spring 304, so that the pin 299 engages the edge of the plate 303 and will normally be driven into any of the notches 300, 301 or 302 to which it may be presented by swinging the handle. In the vertical position shown in Figure 13, the key 277 locks both the stock feed cam drum and the indexing drive mechanism to the cam shaft. By swinging the arm 298 to the intermediate position with the pin 299 engaging in the notch 301, the stock feed cam drum is operatively disconnected from the cam shaft, and when the pin 299 engages in the notch 302 in the dotted line position shown in Figure 13, both the stock feed cam drum and the indexing drive mechanism are operatively disconnected from the cam drum.

*Spindle carrier indexing mechanism*

The indexing drive from the gear 275 is best shown in Figure 4. This gear 275 meshes with a gear 310 journaled on a stub shaft 311, this, in turn, meshing with a gear 312 keyed to a shaft 313, this shaft 313 carrying a Geneva arm 314 having a follower 315 which may be engaged in slots 316 in a Geneva wheel 317 fixed to a shaft 318. This shaft 318 is arranged coaxial with the shaft 16 and is attached to the spindle carrier. At its outer end it may be coupled to a stock reel 319 for indexing of the reel with the spindle carrier, the stock reel having stock guides in line with the work spindles as shown in Figures 2 and 3.

Provision is made to guard against over-indexing and to avoid any effects of inaccuracy in positioning of the spindle carrier for locking the Geneva wheel, this being also shown best in Figure 4. The shaft 313 carries a cam 320 which acts upon a cam follower roll 321 at the end of an arm 322. Fixed to rock with the arm 322 is a second arm 323 having a follower roll 324 adapted to enter one of the Geneva slots 316 angularly spaced from that which will be next engaged by the Geneva follower 315. The cam 320 is so arranged that just before the indexing operation it depresses the free end of the arm 322 and pulls the follower roll 324 out from the Geneva slot, further rotation of the shaft 313 bringing the Geneva follower 315 into another slot of the Geneva wheel and further rotation causing the indexing motion of the Geneva wheel. Before the indexing motion is complete, the cam 320 allows the arm 322 to rise under the action of a leaf spring 325 carried by the machine frame at the supporting block 326 and bearing on a boss 327 projecting from the arm 323, so that as soon as the next succeeding slot 316 comes opposite thereto, the follower 324 springs thereinto, thus stopping further indexing motion of the Geneva wheel during that rotation of the shaft 313. A stop lug 328 on the arm 323, striking an adjustable abutment screw 329, serves to limit the inward motion of the follower 324 into the Geneva wheel slot and to a position where pressure exerted by the Geneva wheel against the follower 324 is substantially lengthwise of the arm 323 where it is most effectively resisted.

This mechanism, however, is not relied upon to lock the spindle carrier in indexed position, which may be effected by a reciprocable locking pin engageable in locking recesses in the spindle carrier as is well known in the art.

The means for actuating the stock feed from the stock feed cam 250 is shown best in Figures 1 to 3 inclusive. The cam 250 has a peripheral cam groove 251 within which rides a cam follower 370 on a lever arm 372. This lever arm is fulcrumed at 373 and has a longitudinal way 374 therein within which is slidable a block 375. This block has a pivoted extension 376 journaled in a block 377 which is carried in a way 378 in the upper arm of a double armed lever 380. This double armed lever is fulcrumed at coaxially spaced upright pins 381 and 382. The block 375 has threaded therethrough a screw 385 which is journaled lengthwise of the arm 372 so that by rotation of this screw 385, the block 375 is moved axially thereof. Since its pivot 376 engages a block 377 in the longitudinal way of the upper arm of the member 380, this adjustment of the block 375 also adjusts the block 377. Thus, as the follower 370 is rocked by the action of the cam 370 to swing the arm 372 through an arc of constant amplitude about its pivot 373, the adjustment of the block 375 from and toward the axis 373 and from and toward the axis 381 and 382, produces a variable amount of swinging of the double arm 380. This determines the arc of swing of the lower arm of the lever 380 and correspondingly the extent of linear motion of a yoke 390. This yoke 390 is guided for motion parallel to the spindles by a splined shaft 391 to which it is clamped and which is slidably mounted and passes through a guide plate 392 at its outer end similarly splined to prevent rotation of this shaft. The yoke 390 carries a cam roll 394 at its lower end which engages in a longitudinal slot 395 in the lower arm of the lever 380. Thus as this lever is rocked to an extent determined by the adjustment of the blocks 375 and 377 in their respective slots, the yoke is moved axially through a correspondingly adjusted amplitude.

One portion of this yoke is provided with an outer cover plate 396 back of which the heads 225 of the stock feed members pass successively as the spindle carrier is indexed. As the double arm 380 is retracted, the feed sleeve 220 for one of the spindles is engaged and retracted to take a fresh grip on the work and on the next succeeding inward motion of this double arm 380, the corresponding stock pusher engaging the stock, moves it ahead to an extent determined by the extent of rocking motion of the two-armed lever and until the stock strikes the stock stop which will later be described.

It will be noted that the yoke 390 projects upwardly almost to a spindle above the loading station. The early portion of the indexing motion of the spindle carrier brings this spindle into cooperative relation to this yoke so that retraction of the feed mechanism may take place at this spindle before the end of the indexing action. When indexing has been completed, the feeding head 225 is back of the plate 396 which engages it and presses upon it for the feeding stroke of the feed lever 380. The screw shaft 385 is provided with a handle 399 by which it may be turned, thus to adjust the extent of stock feed. This adjustment may be made while the machine is in operation, if desired. The nearer the block 375 is adjusted toward the fulcrum 373, the less the extent of angular motion of the arm 372, and this acting on the longer lever arm, causes a still further reduction of motion of the arm 380 and correspondingly a smaller motion of the feed.

From the foregoing description of an embodiment of this invention, it should be evident to those skilled in the art that various changes and modifications might be made without departing from its spirit or scope.

I claim:

In combination, a rotary shaft, means for rotating said shaft, a member journaled on said shaft, a second member journaled on said first mentioned member, a third member fixed to said shaft, a key slidably carried by said third member and movable in one direction to first key said first mentioned member to said shaft and then to key said second member to said first mentioned member and in the opposite direction to first release said second member from said first mentioned member and to then release said first mentioned member from said shaft.

References Cited in the file of this patent

UNITED STATES PATENTS

| Number | Name | Date |
|---|---|---|
| 129,316 | Cheetham | July 16, 1872 |
| 786,353 | Gabriel | Apr. 11, 1905 |
| 1,066,035 | Newton | July 1, 1913 |
| 1,176,601 | Reger | Mar. 21, 1916 |
| 2,137,844 | Miller | Nov. 22, 1938 |
| 2,259,527 | Manville | Oct. 21, 1941 |